Oct. 9, 1962 J. JACOBSEN 3,057,108
FISHLINE SINKER ATTACHMENT
Filed Sept. 28, 1960
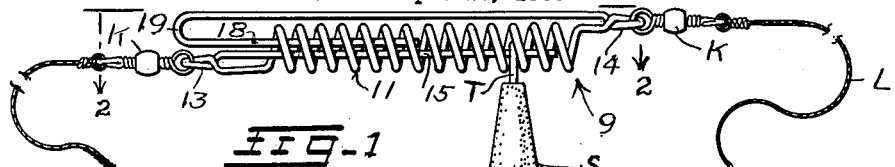
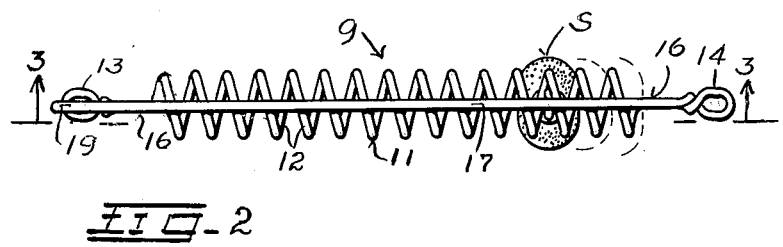
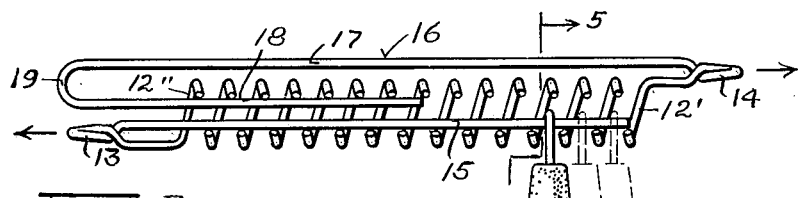
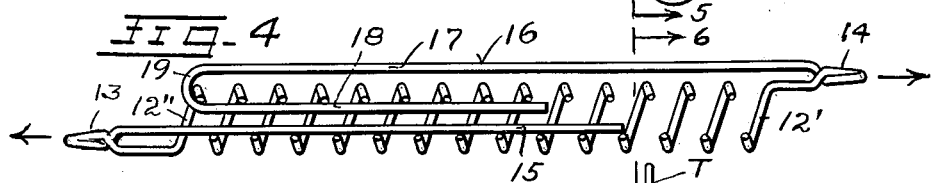
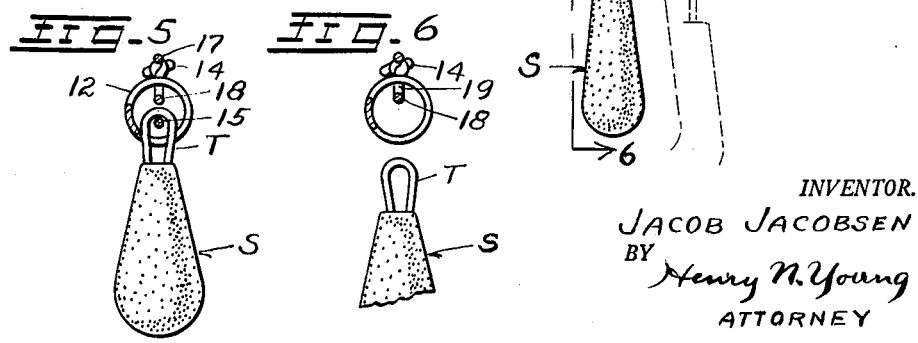
INVENTOR.
JACOB JACOBSEN
BY
Henry N. Young
ATTORNEY

United States Patent Office 3,057,108
Patented Oct. 9, 1962

3,057,108
FISHLINE SINKER ATTACHMENT
Jacob Jacobsen, 1208 Channing Way, Berkeley 2, Calif.
Filed Sept. 28, 1960, Ser. No. 58,976
9 Claims. (Cl. 43—43.12)

The invention relates to an attaching unit for a fishline sinker providing a means for effecting a release of the submerged sinker from the fishline when a predetermined line pull is exerted through the unit.

Fishline sinker-attaching devices of the present type have generally been arranged to release an attached sinker only when a pull of fixed magnitude is exerted through the line, and it is a present major object to provide a sinker-attaching unit having a sinker-release device which is manually and variably settable for predetermining different sinker-releasing pulls required for it.

Another object is to provide a releasable sinker-attaching unit which may not readily become clogged with contacted underwater materials.

A further object is to provide a unit of the character described which is of one-piece structure.

An added object is to provide a releasable sinker-attaching unit utilizing a helical spring in tension and providing a means preventing a tensing of the spring beyond its elastic limit.

The invention possesses other objects and features of advantage which, with the foregoing, will be set forth or be apparent in the following description of a typical embodiment thereof, and in the accompanying drawings, in which, FIGURE 1 is a longitudinal side view showing a present sinker-attaching unit as interposed in a fishline having a sinker releasably attached to the unit.

FIGURE 2 is an enlarged side view of the unit and attached sinker taken from the line 2—2 in FIGURE 1.

FIGURE 3 is a partly sectional view taken from the line 3—3 in FIGURE 2.

FIGURE 4 is a view similar to that of FIGURE 3 but showing the sinker-attaching unit longitudinally extended for the release of the sinker which is shown as falling from the unit.

FIGURE 5 is a view taken from the broken line 5—5 in FIG. 3.

FIGURE 6 is a view taken from the broken line 6—6 in FIGURE 4.

A sinker-attaching unit 9 embodying the features of my invention is particularly illustrated in FIGURE 1 as connected through usual swivel connectors K in a fishline L extending from a fishhook H which may be baited, or be associated with an inedible lure (not shown) for luring fish to the hook, it being understood that the fishline may be provided with a terminal assembly of hooks in lieu of the present single hook. The present unit 9 is particularly adapted for the releasable attachment thereto of a sinker S provided with a flat attaching eye loop T extending from a body of lead or other relatively heavy material; in general terms, the unit 9 includes a straight intermediate helical tension-spring portion 11 having its line of turns 12 connecting terminal eyes 13 and 14 by which the spring 11 is connected to the line in interposed relation thereto by means of the swivels K. For its most efficient use and control in its intended manner, the present sinker-attaching unit 9 includes a sinker-attaching latch bolt means and a stretch-limiting stop means extending from the line-attaching eyes at the different ends of its tension-spring portion 11.

The entire present sinker-attaching unit 9 is arranged for its formation from a single piece of spring wire of suitable length and malleability and resiliency, with the eyes 13 and 14 provided by permanently twisting bight, or return-bend, portions of the wire to provide the eyes 13 and 14 as closed loops at the ends of the spring portion 11. The wire portion 15 beyond the eye 13 extends as a catch bolt within and along the bore of the helical spring 11 and preferably extends no further than the terminal spring turn 12' nearest the eye 14 for its sinker-securing engagement through a sinker-connecting eye T disposed between adjacent spring turns of their line. The spring 11 preferably has its adjacent turns 12 sufficiently spaced axially of the spring that they may freely receive a sinker eye T (FIGS. 1 and 3) between adjacent turns while the spring is in a normally unstretched condition or is stretched by a line pull (FIG. 4), whereby a sinker may be attached to the unit at the spring by inserting the sinker eye between selected adjacent turns of the stretched spring while the spring is manually stretched to withdraw the bolt 15 from the space between said turns and a subsequent retaining engagement of the bolt in the sinker eye by and upon a release of the spring-stretching force.

Understanding that the pull required for stretching the spring 11 between the attaching eyes 13 and 14 therefor increases in proportion to the imposed stretching tension, it will be noted that a stretching of the spring to withdraw the free end of the bolt from between adjacent spring turns 12 is required to provide for insertion of the bolt through the eye T of a manually held sinker S being attached to the manually held unit, and that a subsequent disposal of the bolt end in or beyond a corresponding position by at least the same pull is arranged to release an engaged sinker which is then freed for its gravitational fall and the escape of its eye from the space between the spring turns. In this manner, an attached sinker may be released only when the line pull equals or exceeds that which was required for the retaining engagement of the bolt 15 through the sinker eye, whereby the required sinker-releasing pull is adjustable in accordance with the originally selected disposal of the bolt-engaged sinker eye between adjacent selected spring turns, and a fisherman may thus provide for a desired sinker-release pull in accordance with the size and type of fish being fished for.

The present sinker-attaching unit is also provided with a means for preventing a stretching of its spring portion 11 beyond the elastic limit of the spring to thereby prevent a permant deformation of the spring by an excessive pull on the line which might, for instance, result from a held engagement of the hook with fixed objects (rocks, roots, hulks, etc.) in the fished-in water or by extreme lunges of a caught fish. Accordingly, and as shown, a terminal wire portion 16 extends from the eye 14 and has straight parts 17 and 18 thereof mutually parallel and connected by a return-bend 19 for functioning as a stop means of the unit to prevent a damaging lengthening of the spring under extreme line-pull conditions. As shown, the stop 16 has its part 17 extending along and opposite and beyond the spring 11 externally thereof in parallel relation thereto, and has its end part 18 constantly extending into the portion of the spring 11 closest to the eye 13, with the return-bend or bight 19 of the portion 16 then generally opposite the eye 13 and so spaced from the nearest spring turn 12" that said turn is disposed within the bight 19 for its limiting engagement therewith as a stop to maintain the permitted spring elongation within the elastic limit of the spring.

Aside from the functioning of the portion 16 of the present unit as a means to prevent a stretching deformation of the spring portion 11, it is to be noted that the straight outer side part 17 of the portion 16 is operative to limit the possible travel of an engaged sinker eye along the catch bolt portion 15 to the distance between the adjacent spring turns 12. Also, since the terminal inner part 18 of the stop hook portion 16 of the present one-piece unit is constantly disposed within and along the spring, it will be understood that the parts 16 and 17 constantly serve to cooperatively resist an undue lateral bending of the present unit by reason of its engagement with the outer and inner spring turn sides, and thereby stiffen the unit against an appreciable lateral bowing of the spring as may be urged under use conditions.

In view of the foregoing, it will be understood that an appropriate pull exerted through the present sinker-attaching unit to urge a mutual separation of the attaching eyes 13 and 14 will, because of the resulting axial stretching of the spring, pull the bolt 15 axially through the spring and away from the eye 14, whereby having the bolt 15 engaging a sinker eye T extending between adjacent turns of the spring, a sufficiently strong pull through the unit is arranged to pull the bolt out of the positioned sinker eye for releasing the sinker. Also, since the sinker eye T may be disposed between any adjacent spring turns of the spring for receiving the bolt 15 through the eye to predetermine the pull which is necessary for releasing the sinker, the minimum pull at which a release of a sinker will be effected may be adjustably predetermined in accordance with whichever pair of adjacent spring turns receives the bolt-engaged sinker eye between them. Furthermore, it is desirable to retain a sinker in attached relation to the present unit when fish smaller than those for which it has been set are caught and particularly for fish of illegal length or weight, whereby the sinker may be retained by the unit for its continued use, while the sinker release may still be provided against the resistance of the caught fish and the inertia of the unit and sinker by jerking the line to a required degree for stretching the spring to release the attached sinker in the desired manner. While the present sinker holding-and-release unit may be reversedly interposed in a fishline, it is preferable that the illustrated relation of FIGURE 1 be utilized, since this relation is more protective against an unwanted release of the sinker when an under-sized fish is caught.

From the foregoing description taken in connection with the accompanying drawings, the advantages of the present fishline sinker-attaching unit will be readily understood by those skilled in the art to which the invention appertains. While I have shown and described a structure and operative arrangement which I now consider to comprise a preferred embodiment of my invention, I desire to have it understood that the showings are primarily illustrative, and that such changes and developments may be made, when desired, as fall within the scope of the following claims.

I claim:

1. In combination with a fishline terminating in a fish-catching means and a line sinker comprising a weight member provided with an attaching eye, a sinker-attaching unit comprising a helical tension spring having more than two turns defining a bore arranged to laterally receive the sinker eye between adjacent spring turns selectively, means directly connecting said spring in tensible interposed relation in the fishline, and a bolt member extending fixedly from a spring end and longitudinally in and along the bore of the spring and through the sinker eye extending laterally into the spring bore and between selected adjacent turns of the spring whereby an axial line pull of sufficient magnitude exerted through the spring is adapted to tensionally and axially stretch the spring to withdraw the bolt member from within the sinker eye to free the sinker from the unit.

2. In combination with a fishline terminating in a fish-catching means and a line sinker comprising a weight member provided with an attaching eye, a sinker-attaching unit comprising a helical tension spring having at least three turns defining a bore arranged to receive the sinker eye between adjacent spring turns selectively, means connecting said spring in tensible and direct interposed relation in the fishline, and a bolt member extending fixedly from a spring end and longitudinally in and along the bore of the spring and through the sinker eye extending laterally into the spring bore and between selected adjacent turns of the spring whereby a stretching line pull of appropriate magnitude exerted between the spring ends is adapted to tensionally stretch the spring to withdraw the bolt from between said selected adjacent spring turns and provide for the free disposal of the sinker eye within the spring bore thereat for receiving the bolt member, and a subsequent release of the spring-stretching pull provides for the retained engagement of the bolt through the positioned sinker eye.

3. In combination with a fishline terminating in a fish-catching means and a line sinker comprising a member provided with an eye for use in attaching the sinker to the line, a sinker-attaching unit comprising a normally unstressed helical tension spring having at least three turns defining a bore and axially spaced to freely receive the sinker eye between adjacent spring turns selectively, means directly connecting said spring in interposed relation in the fishline, and a bolt member extending fixedly from a spring end and freely in and along the spring bore of the spring and engageable through the sinker eye extending laterally into the spring bore from between selected adjacent turns of the spring whereby a spring-stretching pull of appropriate magnitude operating between the spring ends is operative to tensionally stretch the spring to provide for the disposal of the sinker eye between selected said spring turns and within the spring bore for receiving the bolt member whereby a release of the spring-stretching pull provides for the sinker-retaining engagement of the bolt in the positioned sinker eye and a subsequent spring-stretching pull of the aforesaid magnitude is operative to withdraw the bolt from the sinker eye to release the sinker from the unit.

4. In combination with a fishline terminating in a fish-catching means and a line sinker provided with an attaching eye, a sinker-attaching unit comprising a helical tension spring arranged to freely receive the sinker eye between adjacent turns thereof, means connecting said spring in interposed relation to the fishline, a bolt member extending fixedly from a spring end and freely in the bore of the spring and through the sinker eye extending in the spring bore between adjacent turns of the spring whereby a line pull of sufficient magnitude exerted through the spring is arranged to longitudinally stretch the spring to withdraw the bolt member from the sinker eye to free the sinker from the unit, and a stop member in the form of a hook extending fixedly from the other spring end and having a straight shank portion extending along the spring externally thereof and providing a terminal return bend receiving the first mentioned spring end and having its bight engageable by the latter spring end to limit the sinker-releasing stretching of the spring within the elastic limit of the spring.

5. In combination with a fishline terminating in a fish-catching means and a line sinker provided with an attaching eye, a sinker-attaching unit comprising a helical tension spring having its turns arranged to receive the sinker eye between adjacent spring turns selectively, means connecting said spring in interposed relation in the fishline, a bolt member extending fixedly from a spring end and longitudinally in and along the bore of the spring and through the sinker eye extending laterally into the spring bore and between adjacent turns of the spring whereby a line pull of sufficient magnitude exerted through the spring is arranged to tensionally stretch the spring to withdraw the bolt member from within the sinker eye to free the sinker from the unit, and a hook member extending fixedly from the other spring end and providing a terminal return bend receiving the first mentioned spring end and having its bight engageable by the latter spring end to limit the sinker-releasing longitudinal stretching of the spring within the elastic limit thereof.

6. The sinker-attaching unit of claim 5 whereof the tension spring and bolt member and hook member comprise integrally related portions of a single element.

7. The sinker-attaching unit of claim 5 whereof the tension spring and bolt member and hook member comprise portions of a single element of spring wire or the like.

8. In combination with a fishline terminating in a fish-catching means and a line sinker provided with an attaching eye, a one-piece sinker-attaching unit comprising an intermediate helical tension spring portion having at least three turns between terminal attaching eyes thereof and directly interposed in the fishline by the connection of said eyes therewith and having its bore arranged to freely and laterally receive the sinker eye between adjacent turns thereof, a bolt member extending fixedly from said spring end eye and freely in the bore of the spring and through the sinker eye extending into the spring bore between adjacent turns of the spring whereby a line pull of sufficient magnitude exerted through the spring is arranged to longitudinally stretch the spring to withdraw the bolt member from the sinker eye to free the sinker from the unit, and a member extending fixedly from the other spring end eye longitudinally along the spring and operative to limit the spiral movement of the bolt-held sinker about the spring to less than three hundred sixty degrees.

9. In combination with a fishline terminating in a fish-catching means and a member provided with an attaching eye for releasably securing the member to the fishline, a line-attaching unit for said member comprising a helical tension spring having at least three turns defining a bore arranged to laterally and selectively receive the eye of said member between adjacent said spring turns, means connecting said spring in directly and solely interposed association with the fishline for an axial stretching of the spring by a pull on the line, and a bolt member extending fixedly from one spring end and longitudinally in and along the bore of the spring and through said member eye while said eye is extended laterally into the spring bore between adjacent said turns of the spring, whereby a longitudinal line pull of appropriate magnitude exerted through the spring is directly operative to tensionally stretch the spring to withdraw the bolt member from within the member eye to thereby free the member eye from the unit.

References Cited in the file of this patent

UNITED STATES PATENTS 2,716,832   Minnie _____ Sept. 6, 1955

FOREIGN PATENTS 706,365   Great Britain _____ Mar. 31, 1954